Nov. 8, 1932.   H. D. BETTS, JR   1,887,192
CONDUIT BOX
Filed May 24, 1929   2 Sheets-Sheet 1
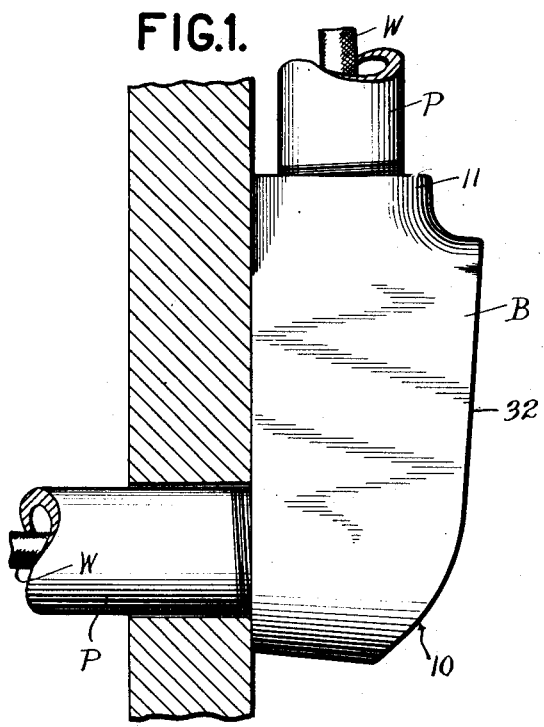
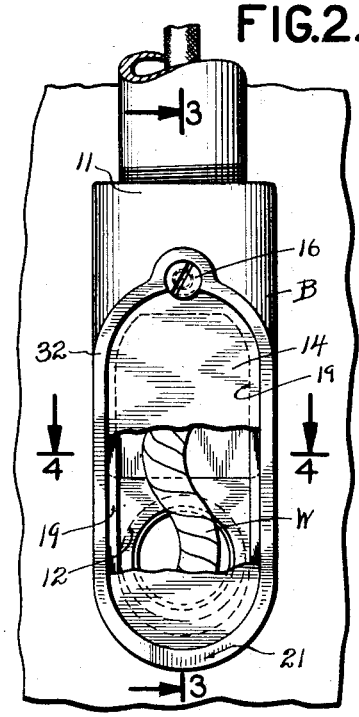
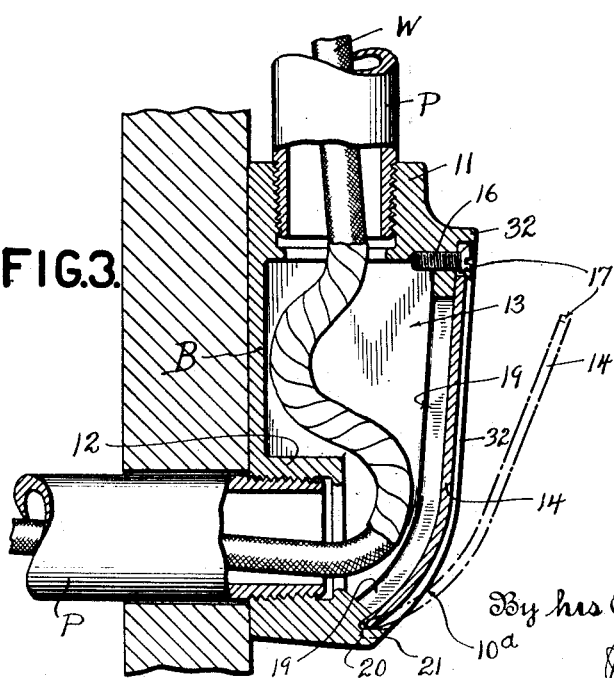
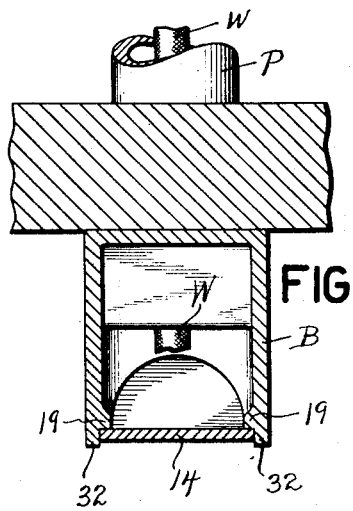
Inventor
HOBART D. BETTS, Jr.
By his Attorneys

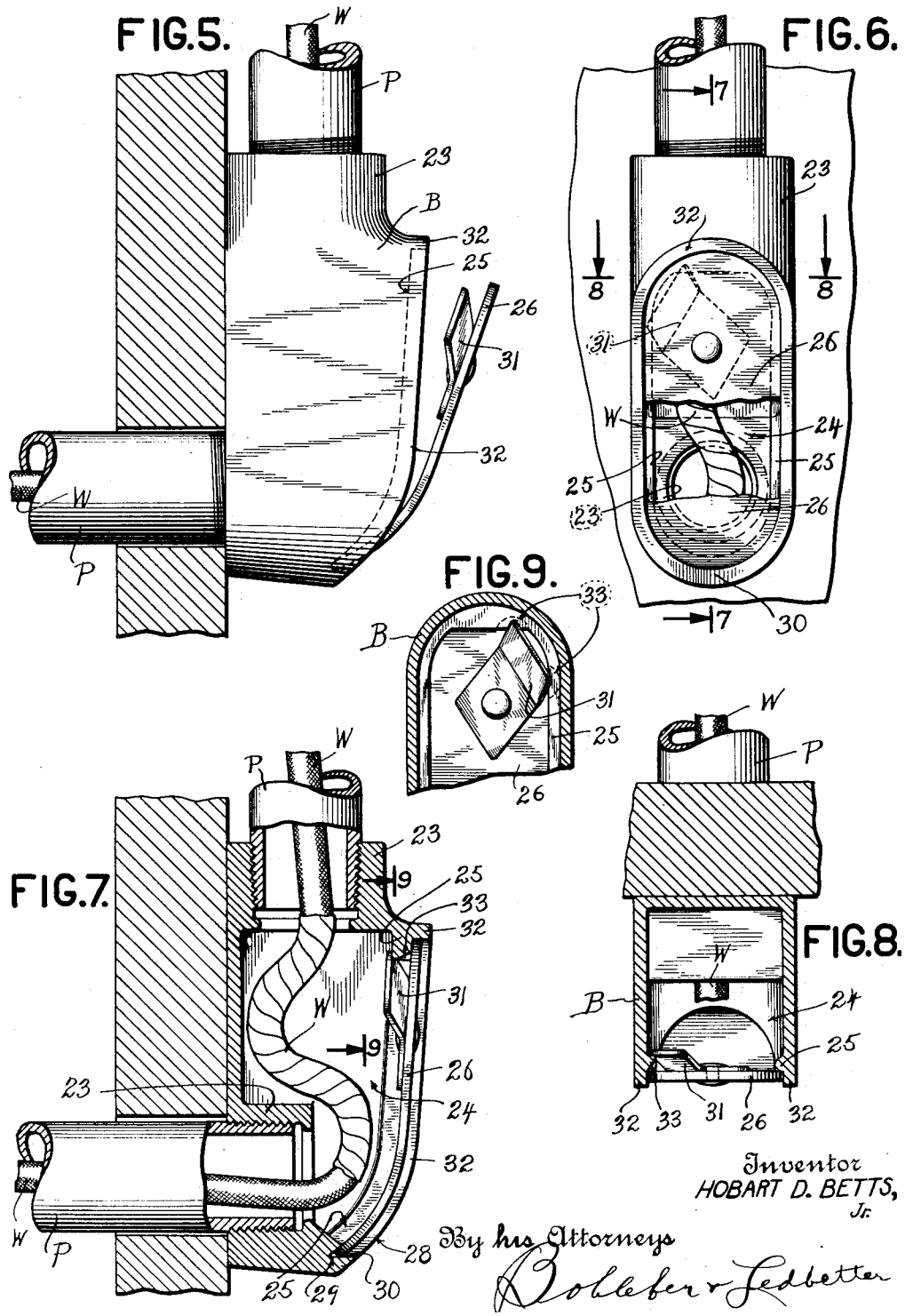

Patented Nov. 8, 1932

1,887,192

UNITED STATES PATENT OFFICE

HOBART D. BETTS, JR., OF ELIZABETH, NEW JERSEY, ASSIGNOR TO THE THOMAS & BETTS CO., OF ELIZABETH, NEW JERSEY, A CORPORATION OF NEW JERSEY

CONDUIT BOX

Application filed May 24, 1929. Serial No. 365,619.

This invention relates to conduit fittings and more particularly to conduit or outlet boxes for use in connection with house wiring installations and the like.

An object of the invention is to produce a conduit box adapted to receive conduits or pipes in which is housed and protected the electrical transmission wires in a wiring system and in which the box includes improved cover means constructed in one or more ways so that access cannot be gained to the interior thereof and hence to the electrical connections inside thereof once the box cover is in place and wire containing conduits are connected to the box. In this way the transmission lines are not easily tapped for current back of the meter where the house and service main connection is made.

A further object of the invention is to produce a removable box lid or cover and anchorage means therefor to secure said lid to the box, and the invention contemplates a wedging undercut anchorage means formed in the lid and box together with a screw or snap fastening means which positively secures the lid and box together.

The accompanying drawings illustrate two embodiments of the invention and it is to be understood that other forms of construction may be adopted without departing from the principles of the invention.

Sheet 1 of the drawings shows one form of the invention wherein the box is made with a removable cover which is screw fastened and hence the box lid or cover may be removed after the pipes are installed and connected to the box.

Figure 1 shows a side view of the box mounted on the side of a wall with the pipes connected to the box; and Figure 2 is a front view thereof with a portion of the box lid or cover broken away to show a part of the taped wiring connection installed in the box.

Figure 3 is a vertical section of the installed box with the lid screw fastened thereon and the lid is tilted outwardly in dotted line position to show how it is removably fastened on the box, and this view is taken on the line 3—3 of Figure 2. Figure 4 shows a cross section on the line 4—4 of Figure 2.

Sheet 2 of the drawings illustrates another form of the invention comprising a snap-on box lid or cover which is irremovable after the pipes are screw fastened to the box and hence the wires are concealed and protected against tampering so that one cannot gain access to the current supply wires in the box.

Figure 5 shows a side view of the installed box and conduits with one end of the box lid inserted in the wedging undercut and the other end tilted outwardly from the box ready to be snapped into finally closed position; and Figure 6 is a front view of the box with a part of the lid broken away to show the interior of the box and the wires therein.

Figure 7 shows a side vertical section as taken on the line 7—7 of Figure 6; and Figure 8 is a cross section on the line 8—8 of Figure 6.

Figure 9 shows a fragmentary section on the line 9—9 of Figure 7 looking at the rear face of the box lid and showing the non-removable snap.

There are shown two forms of construction and both include a simple and positive undercut and wedging anchorage means for one end of a tiltable box lid. The other end of the box lid is screw fastened in one form so as to make the lid removable, and it is positively locked non-removably in the box in the other form to insure against opening the box after the pipes are installed and the wiring job completed.

In conduit and box assemblies, pipes P are usually screw fastened to a box B and wires W are housed in pipes P and the terminals of the two or more wires W are brought into the box B and connected together and are suitably taped to make a connection between the electrical wiring in the building and the lead-in wire from the service line in the street. This box is shown as being elongated and has a lower curved face 10 and has threaded pipe receiving necks or openings 11 and 12. It is desirable to have a large front opening 13 in this type of box so the two wires may be easily connected as by twisting, soldering and suitably taping them. The wires are then pushed back into the box through the opening 13 and a lid 14 is then fastened in place to conceal and protect the wires. The conduit box B comprises then a box member and a lid or lid member 14.

In this first form of the invention, the box lid 14 is crew fastened at one end so that it is easily removable. More particularly the box lid 14 has its lower end curved at 10ª to conform to the rounding lower curvature 10 of the box. The upper end of the box lid 14 is designed to rest under and be anchored to the box by the head of a screw 16. For this purpose the upper end of the box lid may be notched as at 17. The screw head 16 engages and overlies the notch 17 to anchor the box lid in position within the box opening 13. The box lid 14 is rectangular in shape to closely fit and close the similarly shaped box opening 13. The box opening 13 is shouldered as at 19 which forms a ledge or rest against which the box lid 14 seats. The shoulder or ledge 19 is formed well below the outer face or surface of the box and may to advantage be deeply formed in the box hole 13 so as to allow the box lid or cover to fit well into the opening and below the face of the box. This shoulder ledge 19 follows the lower curved outline 10 of the box and extends to the lower end of the box and forms an undercut shoulder, recessed socket or wedge-like means 20. The undercut or angular recess 20 is simply a continuation of the deeply curved ledge 19. In this way the lower curved end of the box lid 14 is positively anchored within the opening 13 once the lower extremity of the box lid is placed in the undercut groove 20 and after the upper pivotal end of the box lid is secured by the screw 16 or other means.

To mount the box lid in position after the wire connections are made in the box, the workman first sets the lower curved end of the box lid in the angular recess or undercut groove 20 and then pivots the upper end of the box lid inwardly, whereupon the screw 16 or other means is set in position to positively secure the lid in place. This form of box lid only requires one anchorage means because the undercut groove and shouldering means at 20 forms an anchorage or socket for one end of the box lid 14 without the necessity of using a screw, bolt or other devices as fastenings at that end. A lip 21 protrudes from the bottom of the groove 20 and forms an abutment or stop which locks the lower end of the lid in place, the arrangement being such that the tip or end 10ª of the lid may be inserted straight into the groove so long as the upper end of the lid is spaced outwardly.

Referring now to the second form of the invention shown in sheet 2 of the drawings, there is illustrated a box assembly similar to that already described and a box B has pipes P connected thereto through which the wires W are run and connected together in the box. Threaded pipe receiving necks 23 integral with the box are designed to receive the screw threaded pipes carrying the wires. The box is made with an elongated opening 24. A lower rib ledge 25 outlines the box opening and provides a seat formed below the front face of the box and against which rests a box lid or cover 26. The lid conforms in size and shape to the opening 24. This form of construction includes a lock-on means to secure the lid in the opening of the box so that the lid cannot be removed once it is installed in place and the pipes P are connected to the box.

The lower portion of the box is curved inwardly at 28 to reduce the depth of the box and provide a lower inwardly curved shape which is followed by the shoulder ledge 25. This inwardly curved deep shoulder ledge 25, at the lower extremity of the box, provides a recessed socket or an undercut wedging means 29 to receive the lower end of the box lid 26 and this construction prevents removal of the box lid. The engagement of the inwardly curved lower extremity of the box lid is hooked into the similarly shaped wedging shoulder means 29 affording a construction which prevents one from prying the box lid open and hence the wires are concealed and protected.

A spring snap lock or catch 31 is anchored on the inside of the box lid 26 at some convenient point. Preferably the snap or catch 31 is anchored to the upper portion of the box lid so that its outer free end may snap behind and engage the shoulder ledge 25. Once the lower end of the box lid is set in position within the undercut seat 29 and the catch 39 is snapped under and behind the shoulder 25, it is impossible to remove the box lid and hence the wires W are not accessible to one who might otherwise tamper with the wire and tap the same to secure current by cutting out or shunting the meter.

The catch 31 is welded, riveted or otherwise anchored to the rear face of the box lid and has its outer free end flexibly spaced from the box lid a distance about equal to the thickness of the shoulder seat 25. To facilitate snapping the catch 31 behind the shoulder 25, the shoulder may be beveled at its point of engagement with the snap, which bevel is indicated by the reference character 33 as shown in Figure 8 which allows the catch to slide over the shoulder.

In some forms of construction it is an advantage to dispose the catch 31 at an angle in relation to the longitudinal axis of the box. In this way the two corners of the catch 31 snaps behind and positively locks against the rear face of the shoulder seat 25, the bevel 33 facilitating the sliding entry of the catch to a locking position behind the shoulder 25. The box lid is positively held to its seat 25 and within the shoulder wedge 29 and is incapable of being pried out by screw driver or any tool for the reason that the box lid is held in place substantially well below the face of the box and for the further reason that both ends of the lid are anchored behind a shoulder and wedging means. A lip 30 completes and rounds out the locking undercut 29 and overlies the lid tip to anchor it in place in the undercut seat 29.

The lower curved ends 10 and 28 of the box are so formed that the shoulders 19 and 25 terminate in the undercut wedging means 20 and 29 and hence, when the upper ends of the box lids are anchored either by the screw or catch 31, it follows that neither end can be pried out. The face of the box is high above the surface of the lid, at least the rim around the box opening projects outwardly to allow the lid to rest down in the box and a prying tool cannot be inserted between the edge of the lid and the wall of the box. It is noted that the shoulder seat 25 and face or flanged edge 32 in both forms of the box, are so designed that the box lids 14 and 26 drop down in the box below the front surface or flanged edge 32 thereby retaining the lid against lateral displacement, and this construction is very rugged because the lid is protected by the thick wall of the box projecting beyond the lid.

The non-releasable snap or catch 31 may be disposed at an angle to the box lid so that the two corners of the upstanding end thereof engage, slide by and lock behind the shoulder 25. Figure 9 and other views show this arrangement and an advantage resides in this disposition of the parts because the catch secures a hold on shoulder portions which extend at an angle to each other. A bevel 33 in the corner of the box insures quick and positive sliding engagement of the spring snap behind the locking shoulder seat.

It will be noted that all of the sides of the lid seat or opening formed by the flange 32 and the lip 30 are parallel with each other or vertical with the axis of the box and that the catch 31 engages the left side of the box, as shown in Figure 6, thereby more securely anchoring this side of the lid 26 and anchoring less securely the right side of the lid. With this construction, a screw driver or other instrument may be inserted between the lid and the flange 32 upon the right edge of the box and pried upwardly without considerable resistance from the angularly disposed catch 31. The lid 26 will pivot along the left hand edge and with the sides of the lid seat being parallel, including the outer side of the socket, the socket 29 although retaining the lid in position against pivotal action of the lid along the upper edge of the lid as a pivot, the socket does not prevent pivotal action of the lid along the left edge.

The position of the socket 29 with the outer side thereof parallel with the sides of the lid seat, may be obtained without affecting its function by the curvature of the box and lid described above.

It is the continuation of the upstanding flange 32 down the curve 10 or 28 to the lower extremity of the box which forms the anchorage lip 21 and 30 to overlie the lower tip of box lid so it cannot be dislodged after the other end thereof is secured to the box. The curvature at the lower box end, from front to back, affords depth in the undercut to grip one end of the box lid when the other end of the lid tilts into the box opening.

It is significant that one end of the box has a compound curvature in that its front face curves toward the rear of the box and the front face is curved, rounded, formed or developed from a radius which is about equal to half the width of the box. These two curves are formed about axes which are substantially at right angles and hence the double or compound curve imparts a characteristic contour to the box end which affords the deep rearwardly extending shelf, lip and ledge means heretofore described.

The inturned end of the lid which cooperates with, fits and tilts into the ledge 20—21 or 29—30 has its tip rounded in a compound fashion similar to the box formation and makes a positively titled locked seating engagement with the box ledge that does not turn loose. The rounded face of the box presents a clean and smooth surface and leaves no cracks or crevices into which a tool may be inserted should attempt be made to unseat and pry off the lid.

The other or upper end of the box, that is the end opposite the compound curvature, may likewise be curved or rounded off in any suitable form. It is shown as a simple upper rounded end box so that the screw 16 or catch 31 at the upper end cooperates with the rounded end of the cover and box portion to anchor together the two parts. By rounding the upper end of the cooperating box and lid, the screw 16 or catch 31, whichever is used, is spaced at a considerable distance from the lower end of the box. The box is reversible as to its ends to suit all conditions of work encountered.

This improved conduit device is used as a junction or pull box and connects the pipes together. It affords easy means of pulling the wires thru the pipes and simplifies the operation of connecting the house circuit to the street circuit.

What is claimed is:

1. In a box having an opening and one portion of the box having a compound curvature forming a curved end to the box and a downwardly curved top at one end of the box, a protruding ledge at the curved portion defining a deep locking seat opening outwardly, a lid having a similarly compounded rounded portion, a tip which fits into the deep seat and having limited pivotal movement therein, and anchorage means spaced from the rounded portion of the box and lid to secure the lid on the box and render effective the locking seat.

2. In a conduit box having an opening, a removable lid closing the opening, the box and lid having cooperating portions fashioned on a curve, an interlocking ledge with a protruding lip which overlies the edge of the lid at the curved portion to hold said edge in the box and permit pivoting of the lid in the ledge, and anchorage means spaced from the interlocking ledge and lip to secure the lid against pivoting in the ledge of the box at said spaced position.

3. In a conduit box having an opening, one end of the box being curved inwardly from the opening toward the rear of the box, a flange extending along the curve and forming a lip at the end of the box, a shoulder formed in the box along the curve and below the outer face of the flange, a lid placed in the opening and curved to conform to that of the box and having one end disposed against the seat below the lip, and anchorage means to secure the other end of the lid in the opening including a snap-over catch attached on the rear of the lid and adapted to engage a shoulder carried on the box and irremovably secure the lid to the box.

4. In a box having an opening, a shoulder in the opening forming a seat, a lid resting upon the seat, the seat being below the box surface and the lid fitting down thereinto, the lid and box being curved at one end from the front to the rear thereof; an overlying lip at the tip of the lid which retains the end of the lid against the box and permits tilting of the lid, and a spring snap on the lid which slides past the shoulder seat to positively lock the lid on the box.

5. In a box having an opening and a lid therefor, angularly disposed portions extending along a curved wall of the box forming a shoulder in the box opening, the shoulder being beveled on the front face thereof, a spring snap attached on the rear of the cover and inaccessible after the box is closed, and being disposed at an angle whereby the corners of the snap engage the angular disposed portions, and anchorage means for securing another edge of the cover to the box.

In testimony whereof I affix my signature.

HOBART D. BETTS, Jr.